United States Patent
Tagashira

(10) Patent No.: US 8,487,236 B2
(45) Date of Patent: Jul. 16, 2013

(54) MULTI-OPTICAL AXIS PHOTOELECTRIC SENSOR

(75) Inventor: Tsuyoshi Tagashira, Osaka (JP)

(73) Assignee: Keyence Corporation, Osaka (JP)

( * ) Notice: Subject to any disclaimer, the term of this patent is extended or adjusted under 35 U.S.C. 154(b) by 380 days.

(21) Appl. No.: 13/036,325

(22) Filed: Feb. 28, 2011

(65) Prior Publication Data

US 2011/0226938 A1  Sep. 22, 2011

(30) Foreign Application Priority Data

Mar. 19, 2010 (JP) .................................. 2010-063735

(51) Int. Cl.
  *G06M 7/00* (2006.01)
  *G08B 13/18* (2006.01)

(52) U.S. Cl.
  USPC .......................................... 250/221; 340/555

(58) Field of Classification Search
  USPC .................................. 250/221; 340/555, 556
  See application file for complete search history.

(56) References Cited

U.S. PATENT DOCUMENTS

| 5,760,389 | A | * | 6/1998 | Biasi ............................. 250/221 |
| 7,122,782 | B2 | | 10/2006 | Sakaguchi |
| 7,485,841 | B2 | | 2/2009 | Inoue et al. |

FOREIGN PATENT DOCUMENTS

| JP | 2002-303684 | 10/2002 |
| JP | 2003-218678 | 7/2003 |
| JP | 2004-356407 | 12/2004 |
| JP | 2008-180649 | 8/2008 |
| JP | 2008-180653 | 8/2008 |
| JP | 2008-181788 | 8/2008 |

* cited by examiner

*Primary Examiner* — Thanh Luu
(74) *Attorney, Agent, or Firm* — Kilyk & Bowersox, P.L.L.C.

(57) ABSTRACT

The invention provides a multi-optical axis photoelectric sensor capable of improving workability of wiring. The sensor outputs to an external apparatus a safe signal generated based upon an interrupted state of at least one optical axis among optical axes formed between the phototransmitter and the photoreceiver. The photoreceiver includes a first cable connecting section (end section case), connected with a cable including a power line for receiving power supply from the external apparatus and an output line for outputting a safe signal to the external apparatus, and a second cable connecting section (end section case), connected with a cable including a power line for performing power supply to the phototransmitter and a communication line for transmitting or receiving a timing signal that defines timing for light projection of the light projecting elements.

8 Claims, 14 Drawing Sheets

F I G. 4
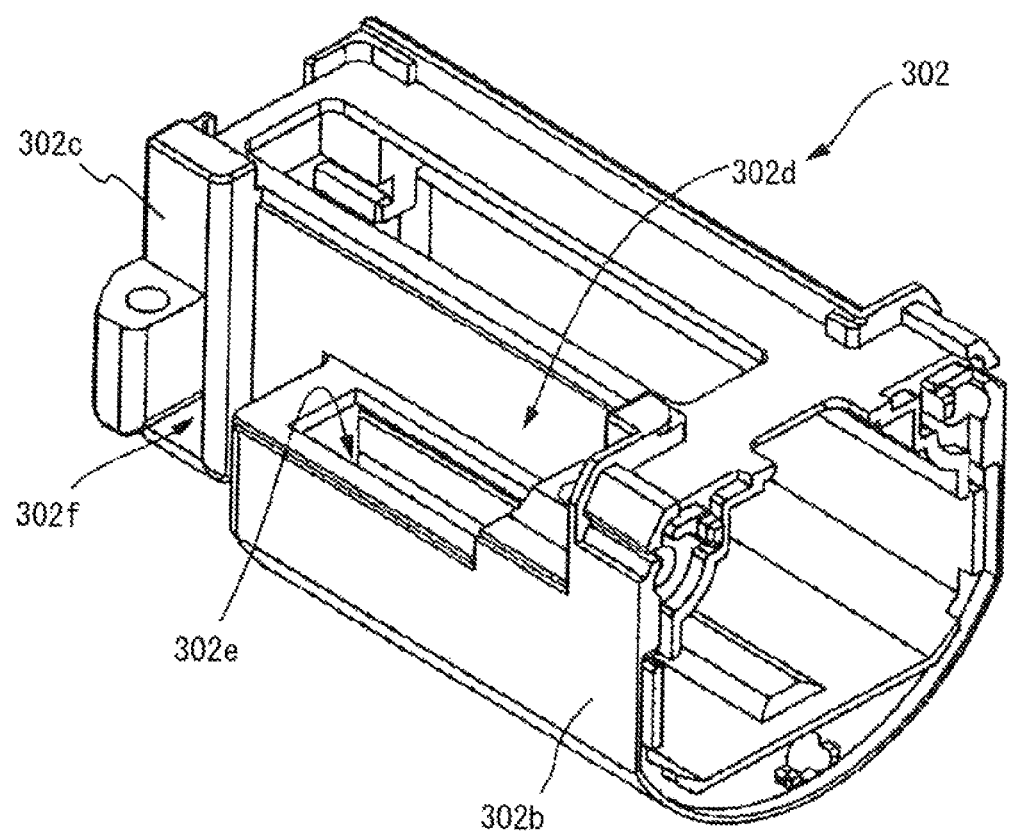

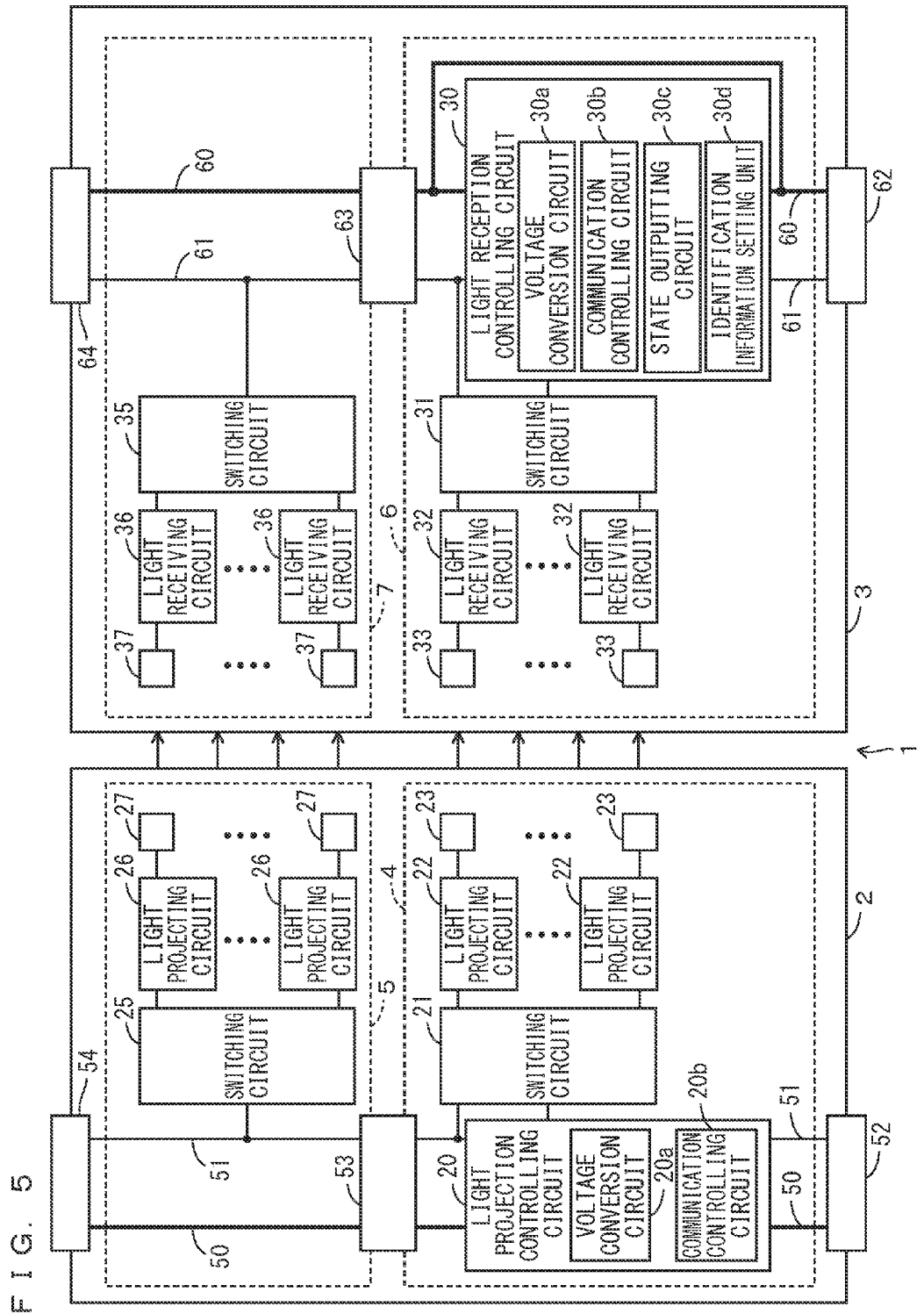
F I G. 5

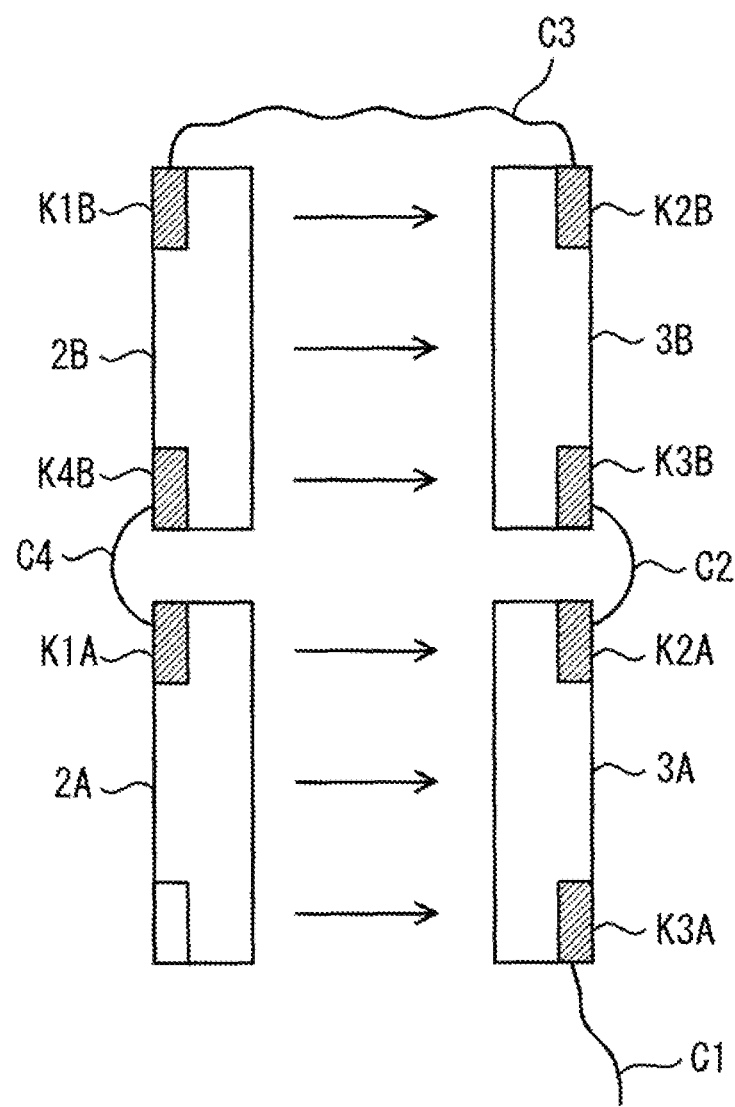
F I G. 7

F I G. 1 2
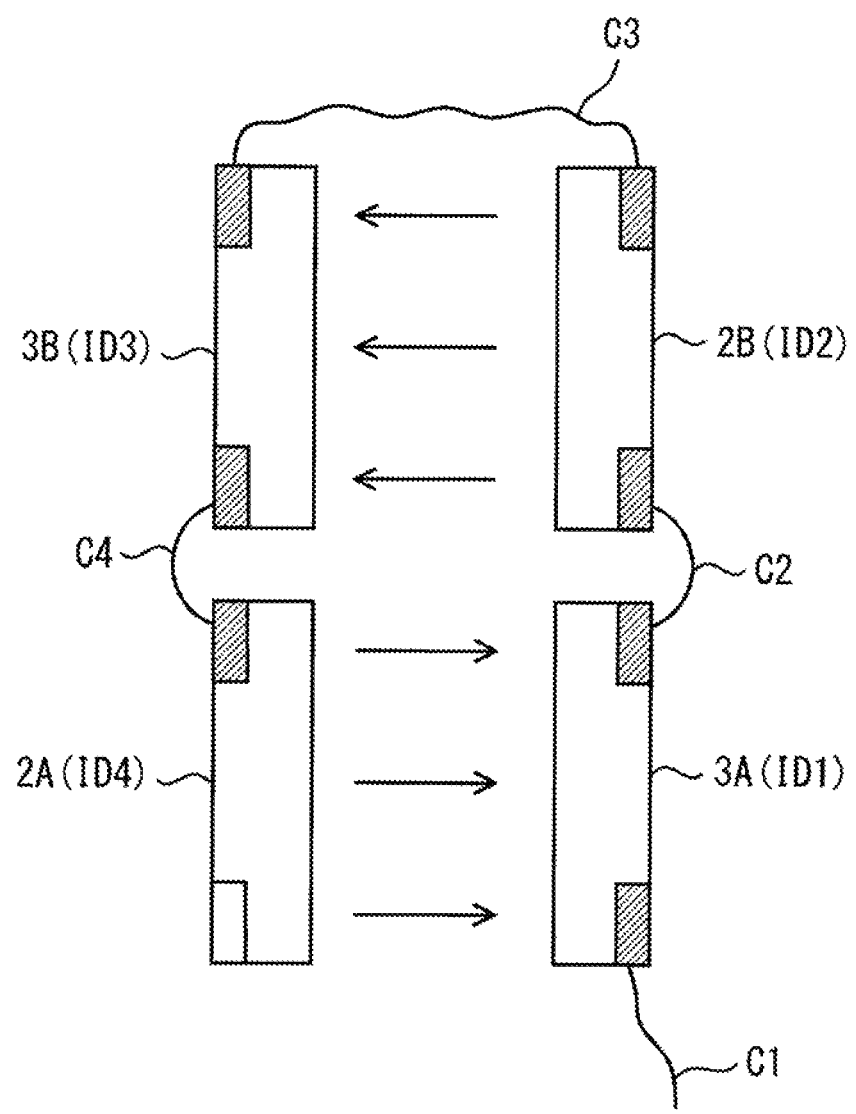

F I G. 17
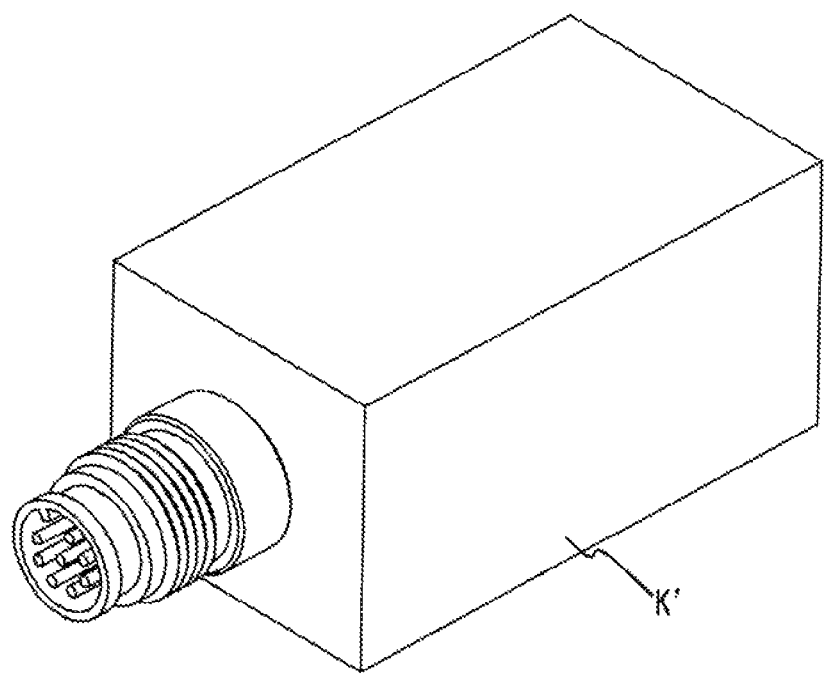

# MULTI-OPTICAL AXIS PHOTOELECTRIC SENSOR

CROSS-REFERENCE TO RELATED APPLICATIONS

The present application claims foreign priority based on Japanese Patent Application No. 2010-063735, filed Mar. 19, 2010, the contents of which is incorporated herein by reference.

BACKGROUND OF THE INVENTION

1. Field of the Invention

The present invention relates to a multi-optical axis photoelectric sensor which detects entry into a predetermined area by means of a plurality of optical axes.

2. Description of the Background Art

In order to ensure safety of a worker from a source of danger such as a presser and a bender, a so-called multi-optical axis photoelectric sensor has hitherto been used as a sensor for detecting a person and an object entering a predetermined area near the source of danger. The multi-optical axis photoelectric sensor has a phototransmitter in which a large number of light projecting elements are arranged in line, and a photoreceiver in which the same number of light receiving elements as the number of the light projecting elements are arranged in line. The phototransmitter and photoreceiver are arranged as opposed to each other, to form a plurality of optical axial columns that partition a dangerous region. The formed plurality of optical axial columns are called a light curtain, and when a light interrupting object enters this light curtain, a safety signal for forcibly stopping an operation of the source of danger is outputted from the light curtain to a control panel that controls the operation of the source of danger. It is thereby possible to ensure the safety of the worker.

Generally, the phototransmitters and the photoreceivers are each connected to the control panel through one cable. Further, for synchronization of timing for light projection/reception between the phototransmitter and the photoreceiver, the phototransmitter and the photoreceiver are connected to each other inside the control panel, for example, through a data communication line (e.g., Japanese Unexamined Patent Publication No. 2008-180653). In a multi-optical axis photoelectric sensor disclosed in Japanese Unexamined Patent Publication No. 2008-180653, a phototransmitter and a photoreceiver are connected through a communication line or a signal line L1.

However, in wiring in which the phototransmitter and the photoreceiver are connected with the control panel through different cables, two cables need to be separately routed to the control panel, and the routing of the wires is thus laborious and may cause deterioration in workability of wiring work.

In this respect, by use of a T-branch connector that combines two cables into one cable, the cables connecting the phototransmitter and the photoreceiver with the control panel may be made into one cable. Specifically, the cable extending from the phototransmitter and the cable extending from the photoreceiver are connected to the T-branch connector to be combined into one cable, and the T-branch connector and the control panel are connected to each other through the one cable. Hence the number of cables connected to the control panel becomes one, thereby making it possible to prevent the foregoing deterioration in workability. However, when it comes to combining cables into one cable by use of the T-branch connector, wiring cost may increase due to an increase in number of components, and the work efficiency may deteriorate due to the fact that the T-branch connector needs to be separately prepared.

SUMMARY OF THE INVENTION

The present invention has been made in view of the above respect, and an object of the present invention is to provide a multi-optical axis photoelectric sensor capable of improving workability of wiring.

A multi-optical axis photoelectric sensor according to the present invention includes: a phototransmitter having a plurality of light projecting elements; and a photoreceiver, arranged so as to be opposed to the phototransmitter and having a plurality of light receiving elements that receive light projected from the plurality of light projecting elements, and outputs to an external apparatus a safe signal generated based upon an interrupted state of at least one optical axis among optical axes formed between the phototransmitter and the photoreceiver, wherein the photoreceiver includes a first cable connecting section, connected with a cable including a power line for receiving power supply from the external apparatus and an output line for outputting a safe signal to the external apparatus, and a second cable connecting section, connected with a cable including a power line for performing power supply to the phototransmitter and a communication line for transmitting or receiving a timing signal that defines timing for light projection of the light projecting elements.

According to such a configuration, since cable-connection between the external apparatus such as a control panel and the photoreceiver through the first cable connecting section and cable-connection between the photoreceiver and the phototransmitter through the second cable connecting section can configure the multi-optical axis photoelectric sensor, deterioration in workability of wiring work can be prevented. Further, since the use of the T-branch connector is not necessary, it is possible to prevent an increase in wiring cost due to an increase in number of components. Moreover, since separate preparation of the T-branch connector is not necessary, it is possible to prevent deterioration in work efficiency.

Further, the multi-optical axis photoelectric sensor according to the present invention may be configured such that a timing signal that defines timing for light projection of the light projecting elements is transmitted between the phototransmitter and the photoreceiver through optical communications (e.g., optical burst signal), and the photoreceiver is provided with a first cable connecting section, connected with a cable including a power line for receiving power supply from the external apparatus and an output line for outputting a safe signal to the external apparatus, and a second cable connecting section, connected with a cable including a power line for performing power supply to the phototransmitter. That is, in terms of the transmission of the timing signal that defines timing for light projection of the light projecting elements, the use of the optical communications enables formation of such a configuration that the power line is included in the cable linking the phototransmitter with the photoreceiver. Also in this case, a single cable is all that is required to link the multi-optical axis photoelectric sensor with the external apparatus, thereby allowing prevention of deterioration in workability and work efficiency of the wiring work.

Moreover, the foregoing second cable connecting section may be connected with a cable including a power line for performing power supply to the phototransmitter and a communication line for performing signal transmission between the phototransmitter and the photoreceiver. That is, such a configuration can also be formed that, in addition to the foregoing power line, the communication line for performing signal transmission between the phototransmitter and the photoreceiver is included in the cable linking the phototransmitter with the photoreceiver. It is thereby possible, for example in the case of the multi-optical axis photoelectric sensor having a mute mode that temporarily invalidates a safety function of the light curtain, to transmit or receive a mute signal between the phototransmitter and the photoreceiver through the second cable connecting section.

Moreover, the foregoing first cable connecting section may be provided at one end of the photoreceiver, and the second cable connecting section may be provided at the other end of the photoreceiver. It is thereby possible to reduce the photoreceiver in optical axial thickness as compared with, for example, the case of the first cable connecting section and the second cable connecting section being located near the center of the photoreceiver.

Moreover, the foregoing photoreceiver may be connected with a photoreceiver for serial addition through the second cable connecting section. It is thereby possible to improve the wiring workability while corresponding to a variety of installation environments of the multi-optical axis photoelectric sensor. Further, since the second cable connecting section is capable of connecting the phototransmitter as well as being capable of connecting the photoreceiver for serial addition, (namely, since the second cable connecting section can be made to serve as a shared cable connecting section for connecting the phototransmitter and the photoreceiver), it is also possible to contribute to reduction in manufacturing cost due to component sharing. Moreover, the user can realize a variety of wiring forms just by purchasing a plurality of sets of multi-optical axis photoelectric sensors having such shared cable connecting sections, so as to eventually increase the degree of freedom of the wiring form.

Moreover, the second cable connecting section of the photoreceiver may be serially connected with at least two or more of the phototransmitters and at least one or more of the photoreceivers, and the phototransmitter and/or the photoreceiver may have an identification information setting unit for specifying the phototransmitter and the photoreceiver opposed to each other, to set identification information for identifying the light projecting elements and the light receiving elements which form optical axes. Thereby, due to the phototransmitter and the photoreceiver being connected through one line, the light projecting elements and the light receiving elements, which form optical axes, can be correctly identified so as to eventually prevent an erroneous operation of the multi-optical axis photoelectric sensor.

The identification information set by the foregoing identification information setting unit may include connection order identifying information for identifying an connection order of all of the serially connected phototransmitters and photoreceivers, and optical axis formation identifying information for identifying the light projecting elements and the light receiving elements which form optical axes by making a pair of connection order identifying information correspond to each other. Further, although the multi-optical axis photoelectric sensor according to the present invention has a set or a plurality of sets of the phototransmitter and the photoreceiver which are in pairs, for example, the sensor can also have a set or a plurality of sets of a paired phototransmitter/photoreceiver.

As thus described, according to the present invention, since a single cable is all that is required to link the multi-optical axis photoelectric sensor with the external apparatus, deterioration in workability of the wiring work can be prevented.

BRIEF DESCRIPTION OF THE DRAWINGS

FIG. 4 is an enlarged perspective view showing a state at the time of enlarging an end section case shown in FIG. 3;

FIG. 5 is a view showing an electrical configuration example of the multi-optical axis photoelectric sensor according to the present embodiment;

FIG. 7 is an explanatory view for describing a wiring form at the time of serially adding the multi-optical axis photoelectric sensor according to the present embodiment;

FIG. 12 is an explanatory view for describing another wiring form at the time of serially adding the multi-optical axis photoelectric sensor according to the present embodiment;

FIG. 17 is another example concerning a connector form.

DETAILED DESCRIPTION OF THE PREFERRED EMBODIMENTS

Hereinafter, a multi-optical axis photoelectric sensor 1 according to an embodiment of the present invention will be described based upon the drawings.

Outer Appearance Configuration

Figure 1:
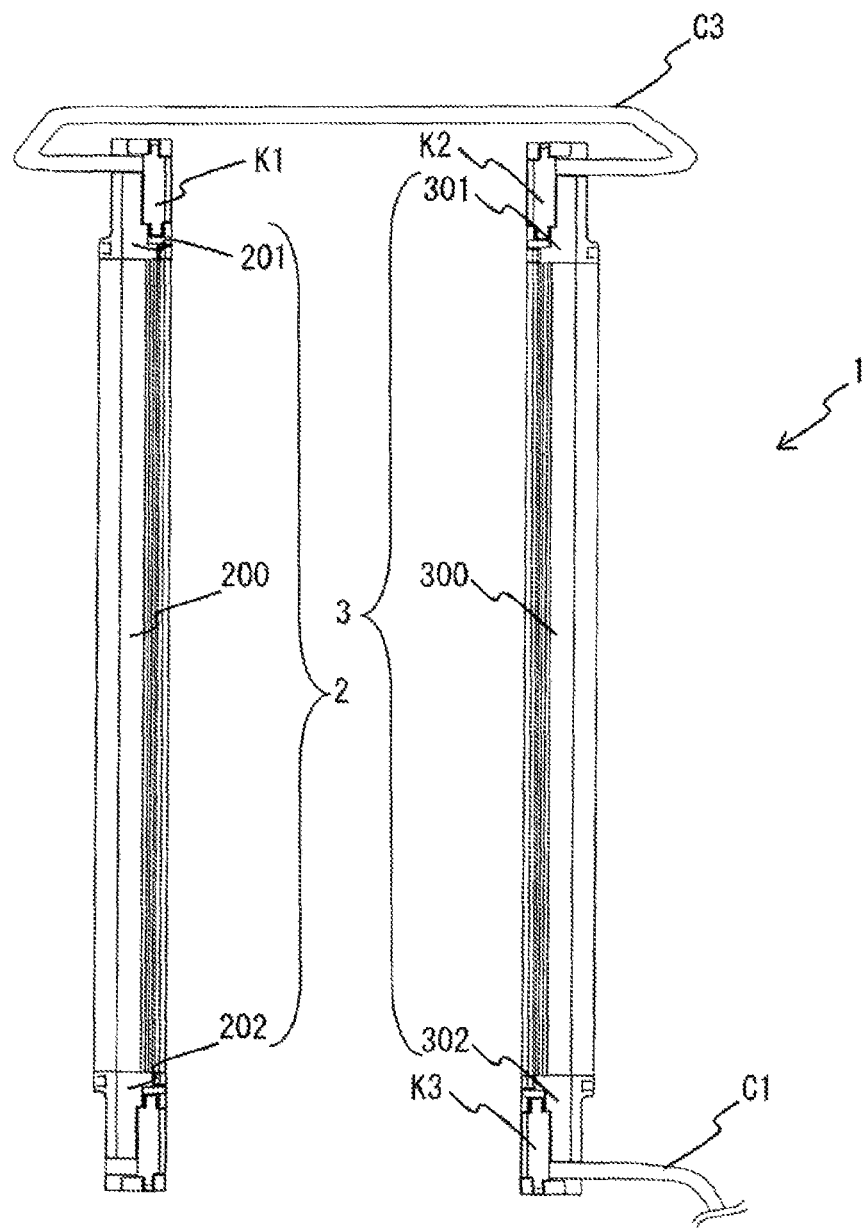
FIG. 1 is a view showing an outer appearance configuration example of a multi-optical axis photoelectric sensor 1 according to an embodiment of the present invention.

FIG. 1 is a view showing an outer appearance configuration example of the multi-optical axis photoelectric sensor 1 according to the embodiment of the present invention. As shown in FIG. 1, a multi-optical axis photoelectric sensor 1 has a phototransmitter 2 and a photoreceiver 3 which are in pairs, and the phototransmitter 2 and the photoreceiver 3 are arranged so as to be opposed to (face) each other on the same plane. For example, optical beams made up of infrared rays are emitted from a plurality of light projecting elements 23, 27 which are provided in the phototransmitter 2 (cf. FIG. 5 described later) toward a plurality of light receiving elements 33, 37 which are provided in the photoreceiver 3 so as to correspond thereto (cf. FIG. 5 described later), thereby to form a safety light curtain between the phototransmitter 2 and the photoreceiver 3.

The phototransmitter 2 has a slender body case 200, an end section case 201 and an end section case 202, and in these cases, a plurality of light projecting elements 23, 27 are arranged in line along a longitudinal direction at equivalent intervals (e.g., interval of 20 nm).

The photoreceiver 3 has a slender body case 300, an end section case 301 and an end section case 302, and in these cases, the same number of receiving elements 33, 37 as the number of light projecting elements 23, 27 are arranged in line along the longitudinal direction at equivalent intervals. The interval between the adjacent light receiving elements 33, 37 is the same as the interval of the light projecting elements 23, 27.

In the multi-optical axis photoelectric sensor 1 according to the present embodiment, a connector K1 is fixed to the end section case 201 of the phototransmitter 2, a connector K2 is fixed to the end section case 301 of the photoreceiver 3, and the connector K1 and the connector K2 are linked through one cable C3. Further, a connector K3 is fixed to the end section case 302 of the photoreceiver 3, and this connector K3 is linked to a cable C1 that is connected to a control panel (not shown). At the time of power supply from the control panel to the phototransmitter 2, the power is supplied through the cable C1, the connector K3, the photoreceiver 3, the connector K2, the cable C3 and the connector K1 in this order like one serial line (one line). In the midstream thereof, the power is supplied to the photoreceiver 3.

Hereinafter, a mechanical configuration and an electrical configuration of the multi-optical axis photoelectric sensor 1 will be described in detail with reference to FIGS. 2 to 6. It is to be noted that the outer appearance configurations of the phototransmitter 2 and the photoreceiver 3 in the present embodiment are substantially the same as those shown in FIG. 1. Further, since the mechanical configurations of the phototransmitter 2 and the photoreceiver 3 have many portions in common, attention is focused on the photoreceiver 3 in descriptions of the mechanical configuration with reference to FIGS. 2 to 4.

Mechanical Configuration

Figure 2:
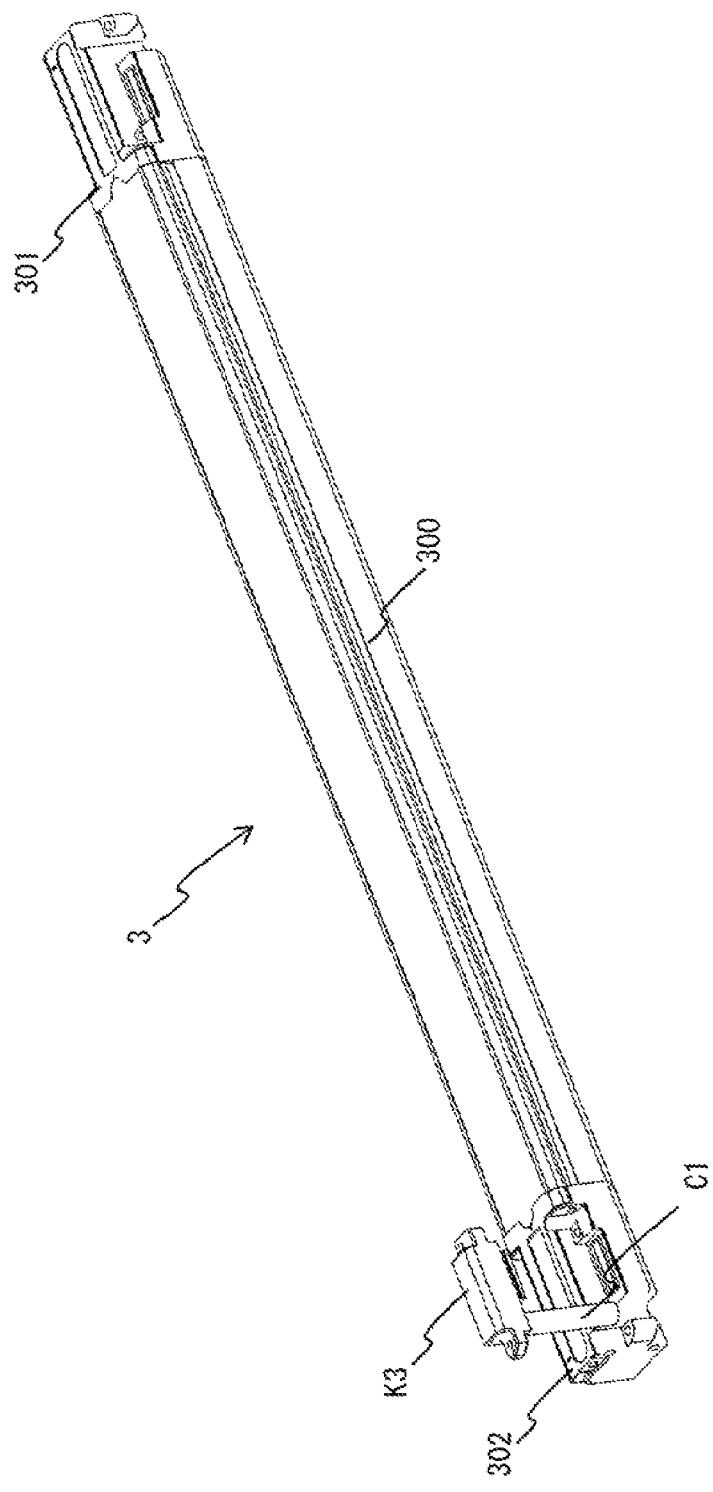
FIG. 2 is a view showing a mechanical configuration example of a photoreceiver of the multi-optical axis photoelectric sensor.
Figure 3:
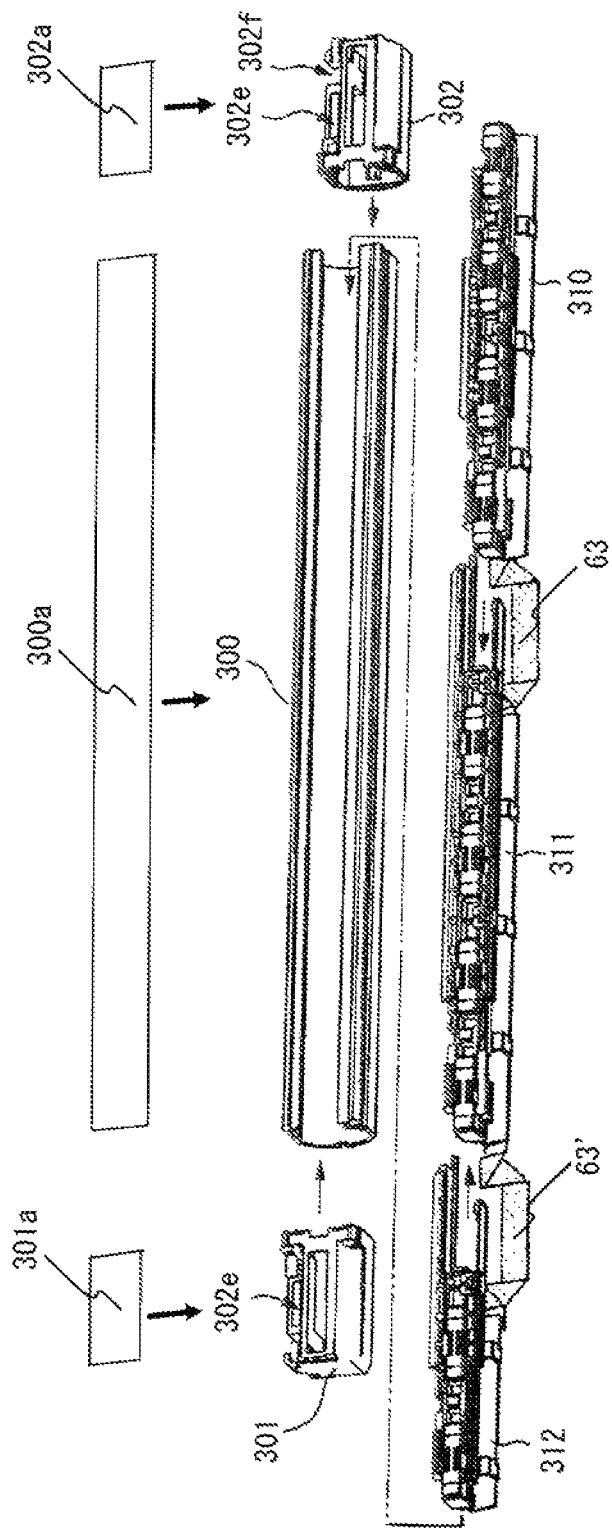
FIG. 3 is an exploded perspective view of the photoreceiver shown in FIG. 2.

FIG. 2 is a view showing a mechanical configuration example of the photoreceiver 3 of the multi-optical axis photoelectric sensor 1. FIG. 3 is an exploded perspective view of the photoreceiver 3 shown in FIG. 2. FIG. 4 is an enlarged perspective view showing a state where the end section case 302 shown in FIG. 3 is enlarged.

As shown in FIGS. 2 to 4, the photoreceiver 3 of the multi-optical axis photoelectric sensor 1 is configured by coupling the end section case 301 and the end section case 302 to both ends of the body case 300, and in the inside of these, there are accommodated a basic module 310 having eight optical axes spaced at equivalent intervals, and a first additional module 311 and a second additional module 312 which are serially coupled to the basic module 310 so as to be unitized (cf. FIG. 3).

As shown in FIG. 3, the first additional module 311 has eight optical axes spaced at equivalent intervals, and the second additional module 312 has four optical axes spaced at equivalent intervals. Hence, the photoreceiver 3 of the multi-optical axis photoelectric sensor 1 according to the present embodiment has 20 optical axes. However, the present invention is not limited thereto, and the number of optical axes is adjustable as appropriate. For example, the basic module 310 can be combined with the additional modules (first additional module 311, second additional module 312, etc.), thereby to realize a variety of number of optical axes, such as 12 optical axes, 16 optical axes, and 24 optical axes.

The body case 300 has the same sectional shape (substantially U-shape with all corners in straight angles, or substantially U-shape with round corners) along the longitudinal direction, and can be manufactured for example by cutting off an aluminum-made material for extrusion molding with a predetermined length, and both ends of the body case 300 are formed in open shape. Each of the end section case 301 and the end section case 302 can be manufactured by use of a plastic mold or a zinc or aluminum die-cast mold, and has one end formed in open shape and the other end formed in closed shape. Further, in the present embodiment, the end section case 301 and the end section case 302 both have such a longitudinal size as to accommodate two optical axes.

The light receiving surface of the photoreceiver 3 is made up of front covers 300a, 301a, 302a which pass light with a specific wavelength therethrough, and optical beams from the phototransmitter 2 are incident on the photoreceiver 3 through these covers. The front covers 300a, 301a, 302a are respectively fixed to the body case 300 and the end section cases 301, 302 with a double-faced adhesive tape, for example (cf. arrows in FIG. 3). It should be noted that, although the front covers 300a, 301a, 302a have a structure of being divided into three parts in the longitudinal direction of the photoreceiver 3 in the present embodiment, those covers may be made up of one member.

As shown in FIG. 4, the end section case 302 has an open-side end section 302b substantially having the same outer shape as that of the body case 300, and a closed-side end section 302c located on the opposite side to the open-side end section 302b and having a closed shape. Further, the end section case 302 has a concave section 302d in notched shape on a side wall between the open-side end section 302b and the closed-side end section 302c. Moreover, the end section case 302 has a connector socket 302e which is opened up in the direction of traversing the end section case 302 (vertically in FIG. 4) while bordering the concave section 302d, and insertion of the connector K3 (cf. FIG. 2) into this connector socket 302e enables the connector coupling.

The connector socket 302e is arranged adjacently to one side wall so as not to interfere with the two optical axes accommodated in the end section case 302. Further, the end section case 302 is formed with a cable passage groove 302f adjacent to the closed-side end section 302c, alongside with the connector socket 302e. That is, the cable passage groove 302f extends in the direction of traversing the end section case 302. As shown in FIG. 2, the connector K3 has a substantially rectangular parallelepiped outer shape, and the cable C1 to be extended out from the outer end of the connector K3 is extended out to the rear surface side of the end section case 302 through the foregoing cable passage groove 302f. It is to be noted that the end section case 301 can also be formed with a similar mechanical configuration to the end section case 302.

As thus described, in the present embodiment, the end section case 302 is provided on one end of the photoreceiver 3, and the end section case 301 is provided on the other end of the photoreceiver 3.

Electrical Configuration

FIG. 5 is a view showing an electrical configuration example of the multi-optical axis photoelectric sensor 1 according to the present embodiment. As shown in FIG. 5, the phototransmitter 2 includes a light projection control module 4, a light projection additional module 5, cable connecting sections 52, 54 made of connector pins, for example, and a light projection module connecting section 53 made of a tape electric wire, for example. The photoreceiver 3 includes a light reception control module 6, a light reception additional module 7, cable connecting sections 62, 64 made of connector pins and the connector sockets 302e, for example, and a light reception module connecting section 63 made of a tape electric wire, for example.

Figure 6:
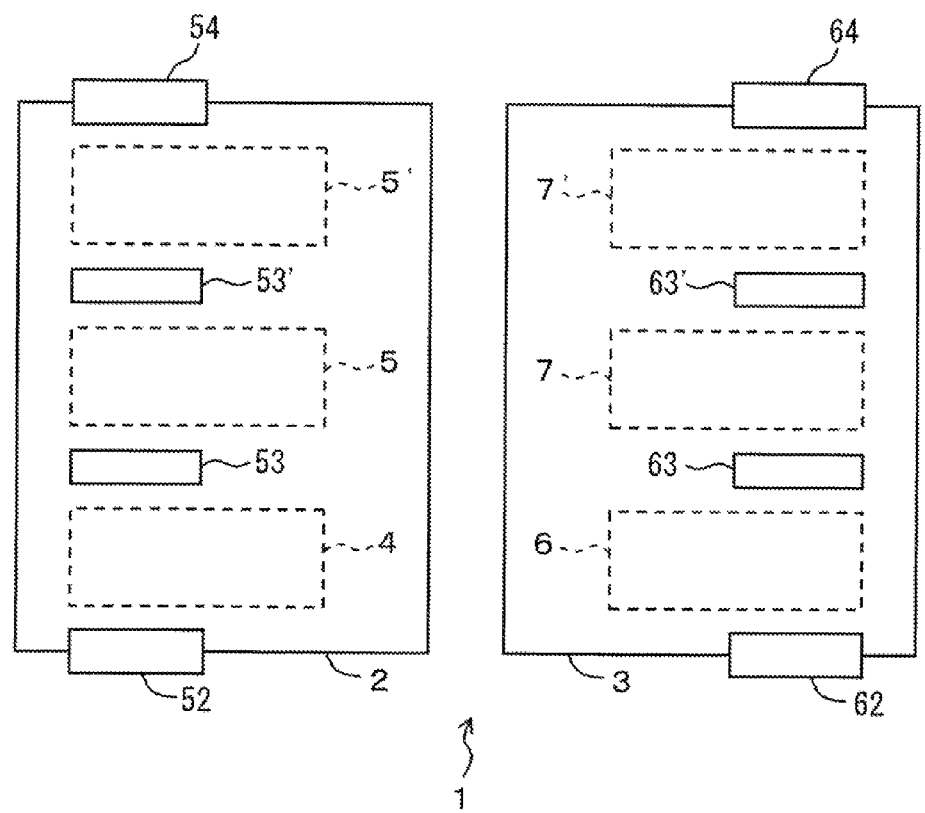
FIG. 6 is a view showing an electrical configuration of the photoreceiver shown in FIG. 3.

It should be noted that the photoreceiver 3 shown in FIG. 3 has an electrical configuration as shown in FIG. 6. Specifically, the light reception control module 6 shown in FIG. 6 is incorporated into the basic module 310 shown in FIG. 3, the light reception additional module 7 shown in FIG. 6 is integrated into the first additional module 311 shown in FIG. 3, and a light reception additional module 7' shown in FIG. 6 is incorporated into the second additional module 312 shown in FIG. 3. Similarly, also on the phototransmitter 2 side, the light projection control module 4, the light projection additional module 5 and a light projection additional module 5' are respectively incorporated into the basic module, the first additional module and the second additional module (not shown). In FIG. 5, for the sake of convenience of description, the light projection additional module 5' shown in FIG. 6 is omitted since being similar to the light projection additional module 5, and the light reception additional module 7' shown in FIG. 6 is omitted since being similar to the light reception additional module 7.

In FIG. 5, the light projection control module 4 of the phototransmitter 2, for example, has a plurality of light projecting elements 23 such as light-emitting diodes that emit infrared rays, a plurality of light projecting circuits 22 that individually drive the plurality of light projecting elements 23, a switching circuit 21 that scans the plurality of light projecting circuits 22 on a time-division basis, and a light projection controlling circuit 20 that totally controls the phototransmitter 2. It is to be noted that a condenser lens, not shown, is provided in front of the light projecting element 23.

The light projection controlling circuit 20 receives a clock signal from a clock generation circuit (not shown), and generates timing for light emission at which the plurality of light projecting elements 23 (and a plurality of light projecting elements 27 in the light projection additional module 5) are made to sequentially emit light. The switching circuit 21 is made up of serially connected shift resistors, for example, and sequentially shifts an output state of the shift resistor at the timing for light projection (clock timing) from the light projection controlling circuit 20, thereby to sequentially light the light projecting elements 23.

Further, the light projection controlling circuit 20 has a voltage conversion circuit 20a for converting, for example, a 24-volt voltage to 5-volt voltage, to supply power to the switching circuit 21, the light projecting circuit 22 (and below-described switching circuit 25 and light projecting circuit 26), and the like, and a communication controlling circuit 20b for controlling provision and reception of a timing signal that defines timing for communication with the photoreceiver 3. It should be noted that, when the phototransmitter 2 is serially added, the communication controlling circuit 20b also controls communication with the serially added phototransmitter 2.

The light projection control module 4 is connected with the light projection additional module 5 through the light projection module connecting section 53. The light projection additional module 5 has the switching circuit 25, the light projecting circuit 26 and the light projecting elements 27 which correspond to the switching circuit 21, the light projecting circuit 22, and the light projecting element 23 in the light projection control module 4. The light projection control module 4 integrally has a plurality of optical axes by means of the light projecting elements 23, 27. It is to be noted that the light projection additional module 5 can be added in an arbitrary manner.

Upon receipt of a command from the photoreceiver 3, the light projection controlling circuit 20 sequentially activates the light projecting circuit 22 and the light projecting circuit 26 in accordance with timing of timing signals (synchronization signals), to light the light projecting elements 23 and the light projecting elements 27 in sequence. Thereby, the phototransmitter 2 sequentially outputs optical beams at predetermined timing toward the photoreceiver 3. This leads to formation of a safety light curtain (cf. arrows in the figure). It should be noted that, although FIG. 5 shows the electrical configuration where the switching circuit 21 and the switching circuit 25 are directly connected to each other by bypassing the light projection controlling circuit 20 and an output of the switching circuit 21 is directly inputted into the switching circuit 25, the present invention is not limited thereto. For example, the output of the switching circuit 21 may be inputted into the switching circuit 25 through the light projection controlling circuit 20.

Meanwhile, the light reception control module 6 of the photoreceiver 3 has a plurality of light receiving elements 33 such as photo diodes, photo transistors or PSDs (Position Sensitive Devices) (photo diodes for position detection) that emit infrared rays, a plurality of light receiving circuits 32 that individually drives a plurality of light receiving elements 33, a switching circuit 31 that scans the plurality of light receiving circuits 32 on a time-division basis, and a light reception controlling circuit 30 that totally controls the photoreceiver 3. It is to be noted that a condenser lens (not shown) is provided in front of the light receiving element 33. Further, an interval between the adjacent light receiving elements 33 (light receiving elements 37) is the same as an interval between the light projecting elements 23 (light projecting elements 27).

The light reception controlling circuit 30 receives a clock signal from a clock generation circuit (not shown) and outputs a clock in synchronization with timing for light projection to the switching circuit 31, to sequentially validate the plurality of light receiving elements 33. The switching circuit 31 is made up of serially connected shift resistors or the like, and sequentially shifts an output state of the shift resistor at clock timing from the light reception controlling circuit 30, thereby to sequentially validate the light receiving elements 33. That is, each of the light receiving elements 33 is selectively driven so as to operate only at the timing for light projection of the light projecting element 23 as its pair, and does not respond to light emitted from the light projecting elements 23 at timing other than the timing for the optical axis of its own.

Further, the light reception controlling circuit 30 has a voltage conversion circuit 30a for converting, for example, a 24-volt voltage to 5-volt voltage, to supply power to the switching circuit 31, the light receiving circuit 32 (and below-described switching circuit 35 and light receiving circuit 36), and the like, a communication controlling circuit 30b for controlling provision and reception of a timing signal that defines timing for communication with the phototransmitter 2, and a state outputting circuit 30c that outputs a state signal to the external control panel or the like. It should be noted that, when the photoreceiver 3 is serially added the communication controlling circuit 30b also controls communication with the serially added photoreceiver 3.

The light reception control module 6 is connected with the light reception additional module 7 through the light reception module connecting section 63. The light reception additional module 7 has the switching circuit 35, the light receiving circuit 36 and the light receiving element 37, which correspond to the switching circuit 31, the light receiving circuit 32 and the light receiving element 33 in the light reception control module 6. The light reception additional module 7 integrally has a plurality of optical axes by means of the light receiving elements 33 and the light receiving elements 37. It is to be noted that the light reception additional module 7 can be added in an arbitrary manner.

The light reception controlling circuit 30 gives a command to the phototransmitter 2 such that outputs from the light receiving elements 33 and the light receiving elements 37 corresponding to optical beams sequentially emitted in sequence from the phototransmitter 2 can be captured, while the light reception controlling circuit 30 sequentially activates the light receiving circuit 32 and the light projecting circuit 36, thereby to sequentially validate the light receiving elements 33 and the light receiving elements 37. In other words, the plurality of light projecting elements 23, 27 and the plurality of light receiving elements 33, 37, which are arranged opposed to each other, sequentially perform light projection/reception operations in accordance with set predetermined timing, thereby to scan optical axes formed by the light projecting elements 23, 27 and the light receiving elements 33, 37 which correspond to each other. In addition, the timing signal that defines the timing for light projection of the light projecting elements 23, 27 can also be transmitted from the phototransmitter 2 to the photoreceiver 3, and can also be transmitted from the photoreceiver 3 to the phototransmitter 2. Further, although FIG. 5 shows the electrical configuration where the switching circuit 31 and the switching circuit 35 are directly connected to each other by bypassing the light reception controlling circuit 30, and an output of the switching circuit 31 is directly inputted into the switching circuit 35, the present invention is not limited thereto. For example, the output of the switching circuit 31 may be inputted into the switching circuit 35 through the light reception controlling circuit 30.

The state output circuit 30c has the function of comparing a light reception signal obtained from the light receiving circuit 32 with a predetermined threshold, to output an ON/OFF binary signal representing light incident/interrupted states to the external control panel (such as an emergency stop device for a source of danger like a puncher, a presser, a machine tool, or a caster) through a cable connecting section 62. More specifically, based upon signals from the light receiving circuit 32 and the light projecting circuit 36 which are outputted through the switching circuit 31 and the switching circuit 35, the state output circuit 30c outputs to the external control panel or the like a binary signal as a safety signal which corresponds to a first state as a state where all optical axes are incident and a second state as a state where at least one optical axis is interrupted. Examples of the safety signal may include an OSSD (Output Signal Switching Device) and an FSD (Final Switching Device). The OSSD is a constitutional component of ESPE (Electro-Sensitive Protective Equipment) connected to a control system for an apparatus to be controlled, such as the presser, and is a signal that comes into an OFF state associated with activation of a sensor during normal operation of the apparatus to be controlled. This OFF state corresponds to the foregoing second state. Further, the FSD is one component of the safety related control system of the apparatus to be controlled, and serves to shut down an MPCE (Machine Primary Control Element) circuit when the OSSD comes into the OFF state. It is to be noted that the MPCE is an element which directly controls normal operation of the apparatus to be controlled and is electrically driven, as well as an element which operates last temporally upon activation or stoppage of operation of the apparatus to be controlled. Such a safe signal functions as an operation stop signal to stop the operation of the apparatus to be controlled.

Further, the multi-optical axis photoelectric sensor 1 has a normal mode and a mute mode. The normal mode is a mode to detect an entering person or an entering object in accordance with the interrupted state of the optical axis, and the mute mode is a mode to temporarily invalidate a safety function of a light curtain made up of optical axes when a work passes through the light curtain. In the mute mode, the state output circuit 30c outputs a signal corresponding to the foregoing first state regardless of incidence/interruption of optical axes.

Herein, in the multi-optical axis photoelectric sensor 1 according to the present embodiment, as described using FIG. 1, the connector K1 provided at one end of the cable C3 is fixed to the end section case 201 of the phototransmitter 2, and the connector K2 provided at the other end of the cable C3 is fixed to the end section case 301 of the photoreceiver 3, while the connector K3 provided at one end of the cable C1 is fixed to the end section case 302 of the photoreceiver 3. That is, with reference to FIG. 5, the connector K1 is fixed to a cable connecting section 54 of the phototransmitter 2, the connector K2 is fixed to a cable connecting section 64 of the photoreceiver 3, and the connector K3 is fixed to the cable connecting section 62 of the photoreceiver 3.

The cable C1 and the cable C3 are made of shield lines excellent in noise immunity. The cable C1 has an output line for outputting the foregoing safe signal and a power line made up of a + (plus) potential line (e.g., +24 V) and a − (minus) potential line (e.g., 0 V). Therefore, the cable C1 is a cable is a cable including the power line for receiving power supply from the external apparatus and the output line for outputting the safe signal to the external apparatus. It should be noted that, although the power line is made up of the + (plus) potential line and the − (minus) potential line in the present embodiment, it may be configured with any wiring aspect so long as the wiring aspect allows power supply to the photoreceiver 3.

Further, the cable C3 is a cable including a power line for performing power supply to the phototransmitter 3 and a communication line for transmitting or receiving a timing signal that defines timing for light projection of the light projecting elements 23, 27 to the phototransmitter 2. A current supplied from the control panel through the cable C1 and the cable connecting section 62 flows along a power line 60 shown in FIG. 5. As shown in FIG. 5, this power line does not pass through the inside of the light reception controlling circuit 30 but bypasses outside the light reception controlling circuit 30, to be linked to the cable connecting section 64. The current supplied to the cable connecting section 64 is supplied to the cable connecting section 54 through the cable C3, and supplied to the light projection controlling circuit 20 through a power line 50. In this manner, the photoreceiver 3 is configured so as to be capable of supplying power, supplied from the control panel, to the phototransmitter 2. In addition, differently from FIG. 5, the power line 60 inside the photoreceiver 3 may be wired so as to be linked to the cable connecting section 64 through the inside the light reception controlling circuit 30.

Processing Operation

A basic operation in the multi-optical axis photoelectric sensor 1 is to make the light projecting elements 23, 27 of the phototransmitter 2 cyclically perform scanning light projection at a predetermined interval by means of the switching circuits 21, 25, and to make scanning light reception cyclically performed by means of the switching circuits 31, 35 of the photoreceiver 3 as pairs in synchronization with the timing for light transmission, so as to detect incidence/interruption of each optical axis.

The synchronization between the timing for light projection of the light projection controlling circuit 20 and the timing for light reception of the light reception controlling circuit 30 can be performed by transmitting a synchronization recognition pulse pattern from the photoreceiver 3 side to the phototransmitter 2 side through the communications lines 51, 61 (FIG. 5) and the cable C3. Conversely, it is possible that the phototransmitter 2 makes the light projecting elements 23, 27 sequentially emit light, and a synchronization pattern in accordance with the timing for light emission is transmitted from the phototransmitter 2 side to the photoreceiver 3. Further, as for the synchronization between the photoreceiver 3 and the phototransmitter 2, other than the technique using such an electrical signal, there can also be considered a technique (optical synchronous communications) for transmitting an optical burst signal so as to transmit a timing signal that defines timing for light projection of each of the light projecting elements 23, 27. The burst signal is a signal that is transmitted at a predetermined interval in time-division multiplex optical communications, and the like. Using such a burst signal eliminates the need for the communication line between the phototransmitter 2 and the photoreceiver 3, namely the communication line inside the cable C3, and a cable made up only of the power line for supplying power to the phototransmitter 2 is connected to the cable connecting section 64.

Further, it is also possible to form such a configuration that the cable connecting section 64 is connected with a cable including not only the power line for supplying power to the phototransmitter 2 but also a communication line (COM line) for transmitting a signal such as display information, a mute signal, a light projection stop signal, or a signal of a general-purpose output (output simultaneously with safety output), a state output (locked-out state, weak light incident state, mute state) or the like between the phototransmitter 2 and the photoreceiver 3.

As described above, the light reception controlling circuit 30 determines that no object has entered the detected area in the case where every optical axis is uniformly in the incident state, whereas determining that an object has entered the detected area in the case where even one optical axis has come into the interrupted state, and the state outputting circuit 30c then outputs the safe signal.

Serial Addition

The phototransmitters 2 or the photoreceivers 3 can be serially added through a cable including the communication line. That is, the plurality of phototransmitters 2 or the plurality of photoreceivers 3 can be coupled with one another in line through the cable. Concerning the photoreceiver 3, the photoreceiver 3 for serial addition can be connected through the cable connecting section 64. The same also applies to the phototransmitter 2. The serial addition of the phototransmitter 2 and the photoreceiver 3 are described using FIGS. 7 and 8.

Figure 8:
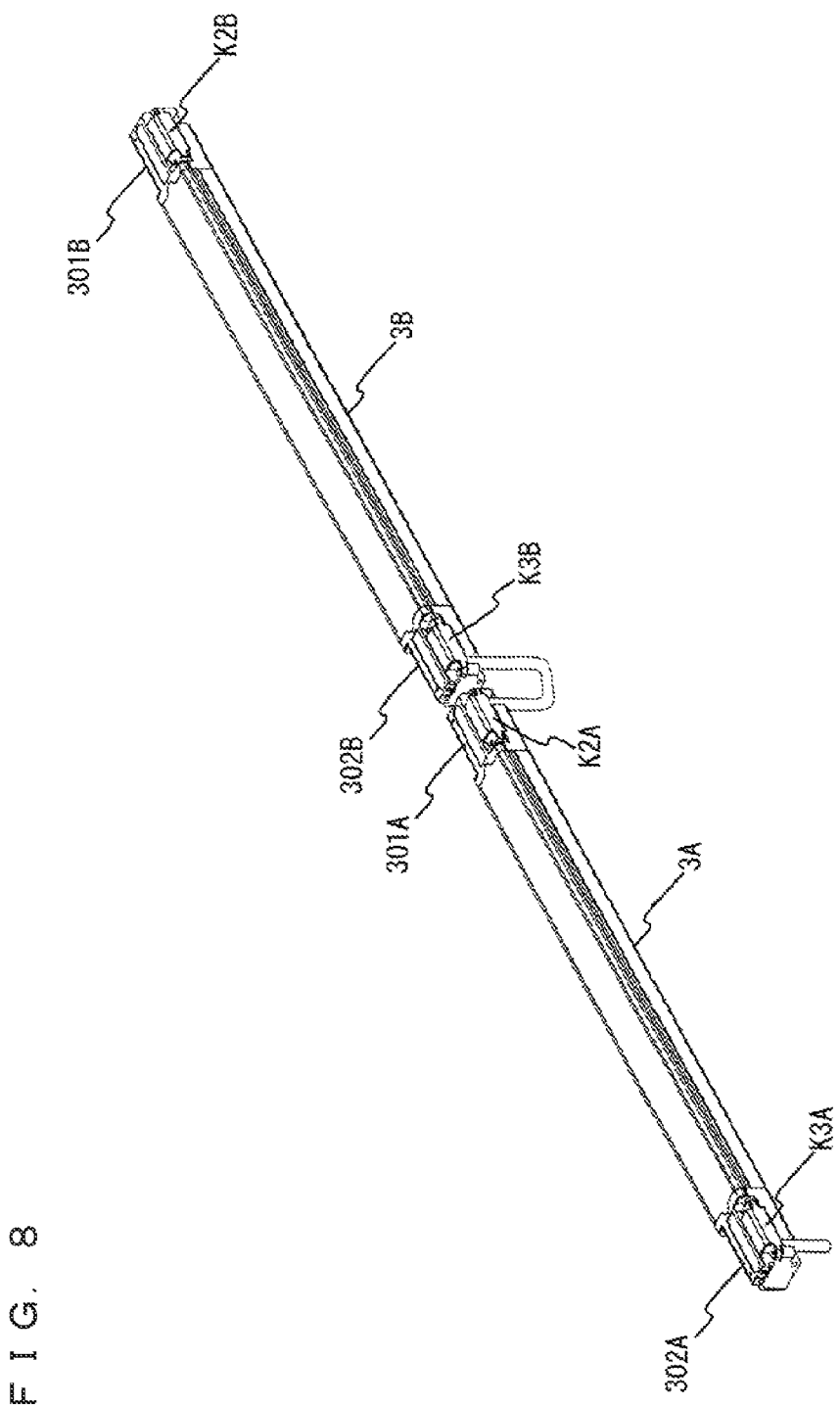
FIG. 8 is an outer appearance view showing a state of a photoreceiver being serially added with a photoreceiver.

FIG. 7 is an explanatory view for describing a wiring form at the time of serially adding the multi-optical axis photoelectric sensor 1 according to the present embodiment. FIG. 8 is an outer appearance view showing a state of a photoreceiver 3A and a photoreceiver 3B being serially added.

As shown in FIG. 7 and FIG. 8, a phototransmitter 2A and the photoreceiver 3A which are in pairs form one multi-optical axis photoelectric sensor, and a phototransmitter 2B and the photoreceiver 3B which are in pairs form one multi-optical axis photoelectric sensor. One end of the photoreceiver 3A is fixed with a connector K3A linked with the cable C1. The other end of the photoreceiver 3A is fixed with a connector K2A linked with a cable C2. Similarly, both ends of the photoreceiver 3B are fixed with a connector K3B linked with the cable C2 and a connector K2B linked with the cable C3, and both ends of the phototransmitter 2B are fixed with a connector K1B linked with the cable C3 and a connector K4B linked with the cable C4. One end of the phototransmitter 2A is fixed with a connector K1A linked with a cable C4.

In FIG. 8, since the same ones as the photoreceiver 3 of the multi-optical axis photoelectric sensor 1 shown in FIG. 1 are used for both the photoreceiver 3A and the photoreceiver 3B, an end section case 301A fixed with the connector K2A shown in FIG. 8 is the same as an end section case 301B fixed with the connector K2B, and the same as the end section case 301 of the photoreceiver 3 shown in FIG. 1. That is, the end section case 301 shown in FIG. 1 can be fixed with the connector K2A for serial addition (end section case 301A shown in FIG. 8), and can also be fixed with the connector K2B so as to connect the cable C3 linking the phototransmitter 2 with the photoreceiver 3 (end section case 301B shown in FIG. 8).

In such a manner, the end section case 301 shown in FIG. 1 can be connected with the photoreceiver 3 for serial addition, as well as being connected with the phototransmitter 2, and functions as a shared cable connecting section. This can contribute to reduction in manufacturing cost due to component sharing, and increase the degree of freedom of the wiring form.

As shown in FIG. 7, in the case of serially adding the photoreceiver 3B to the photoreceiver 3A and serially adding the phototransmitter 2B to the phototransmitter 2A while coupling the phototransmitter 2B with the photoreceiver 3B through the cable C3, power is supplied from the control panel in the order of the photoreceiver 3A, the photoreceiver 3B, the phototransmitter 2B and the phototransmitter 2A.

Figure 9:
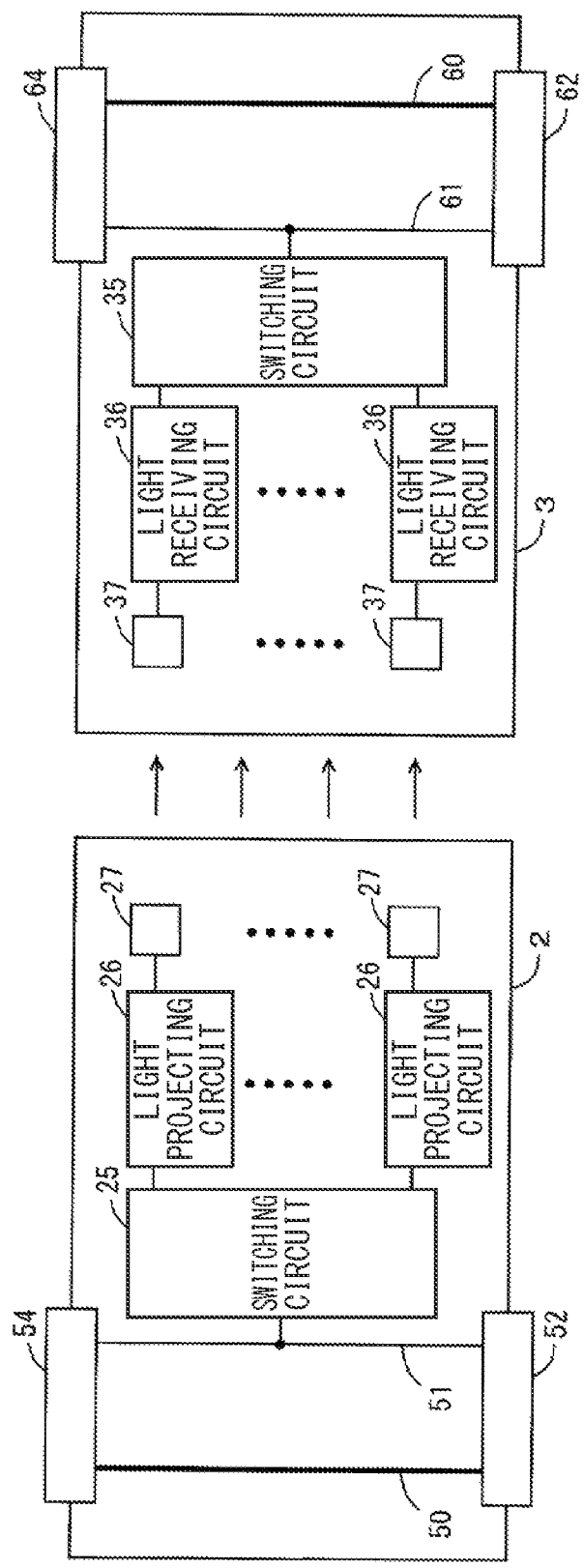
FIG. 9 is a view showing another electrical configuration example of the multi-optical axis photoelectric sensor according to the present embodiment.

It should be noted that, as described above, the same ones as the photoreceiver 3 of the multi-optical axis photoelectric sensor 1 shown in FIG. 1, namely the photoreceiver 3 having the light reception controlling circuit 30, are used for both the photoreceiver 3A and the photoreceiver 3B, but as for the phototransmitter 2B and the photoreceiver 3B to be serially added, for example as in FIG. 9, the phototransmitter 2 not having the light projection controlling circuit 20 and made up only of an additional light projection module, and the photoreceiver 3 not having the light reception controlling circuit 30 and made up only of an additional light reception module may be used.

In the case of serially adding the multi-optical axis photoelectric sensor 1, it is necessary to adjust timing for light projection/reception of the phototransmitter 2A, the phototransmitter 2B, the photoreceiver 3A and the photoreceiver 3B, so as to prevent mutual interference. That is, since the safety light curtain detects light incident/light interrupted states by means of projection and reception of light, a problem of a mutual interference may occur in which light projected from another light projecting element is incident on an originally unrelated light receiving element and the safety signal brings about an erroneous operation. In order to prevent this mutual interference, the timing for light projection may be displaced and temporally separated.

Specifically, each of the serially connected phototransmitters 2 and each of the serially connected photoreceivers 3 are installed (connected) onto the same buses (the communication line 51 and the communication line 61 shown in FIG. 5), and communication control is, for example, performed regarding as a master (main) the light reception control module 6 in the photoreceiver 3A closest to the control panel. The light reception control module 6 (communication controlling circuit 30b) in the photoreceiver 3A issues a command to the phototransmitter 2A and/or the phototransmitter 2B (the communication controlling circuits 20b inside the light projection control module 4) that the phototransmitter 2A and/or the phototransmitter 2B allocate timing for synchronization (timing for light projection) to each of the phototransmitters (phototransmitter 2A and phototransmitter 2B). Meanwhile, the light reception control module 6 (the communication controlling circuit 30b) of the photoreceiver 3A allocates the timing for synchronization (timing for synchronization) to each of the photoreceivers (photoreceiver 3A and photoreceiver 3B). This can solve the foregoing problem of mutual interference.

Herein, in allocating the time required for the light projection/reception operation to each of the phototransmitters and each of the photoreceivers, a connecting order of the phototransmitters and the photoreceivers needs to be recognized. That is, the phototransmitter and the photoreceiver, which are arranged as opposed to each other, need to be specified. As for FIG. 7, for example, not the photoreceiver 3A but the photoreceiver 3B is arranged as opposed to the phototransmitter 2B. Since a variety of wiring forms can be considered in the multi-optical axis photoelectric sensor 1 according to the present embodiment, it is necessary to identify the light projecting elements 23, 27 and the light receiving elements 33, 37 which form optical axes.

Therefore, the phototransmitters 2A, 2B and the photoreceivers 3A, 3B are each provided with an identification information setting unit for specifying the phototransmitter and the photoreceiver opposed to each other, to set identification information for identifying the light projecting elements 23, 27 and the light receiving elements 33, 37 which form optical axes. As an example of the identification information setting unit, a DIP (Dual In-line Package) switch is considered. Specifically, for example, the DIP switch provided in each of the phototransmitters 2A, 2B and the photoreceivers 3A, 3B can switch between "1" and "2" as identification information (e.g., switching to 1 by tilting the DIP switch toward the left, and switching to 2 by tilting toward the right, etc.). Herein, the connection is made in the order of the photoreceiver 3A having been set to ID1 at power-on, the photoreceiver 3B having been set to ID2 at power-on, the phototransmitter 2B having been set to ID3 at power-on, and the phototransmitter 2A having been set to ID4 at power-on. The photoreceiver 3A set to ID1 and the phototransmitter 2A set to ID4 are set as the identification information "1", and the photoreceiver 3B set to ID2 and the phototransmitter 2B set to ID3 are set as the identification information "2". Based upon this identification information, the light projecting elements and the light receiving elements of the phototransmitter 2A and the photoreceiver 3A can sequentially perform light projection/reception operations at predetermined timing, while the light projecting elements and the light receiving elements of the phototransmitter 2B and the photoreceiver 3B can sequentially perform light projection/reception operations at predetermined timing. That is, by synchronizing the phototransmitter 2A of ID4 and the photoreceiver 3A of ID1, or synchronizing the phototransmitter 2B of ID3 and the photoreceiver 3B of ID2, the multi-optical axis photoelectric sensor 1 can be prevented from performing an erroneous operation due to the interference.

It is to be noted that, although the identification information setting unit has been described herein by use of the DIP switch, there are considered a variety of other methods. A method can also be considered in which a personal computer connected to the phototransmitter 2 or the photoreceiver 3, or a personal computer connected to the control panel, for example is used to store identification information (identification flag 1 or identification flag 2, or whether or not an identification flag stands) into, for example, a memory provided in the light projection controlling circuit 20 of the light projection control module 4, while the identification information is stored into, for example, a memory provided in the light reception controlling circuit 30 of the light reception control module 6. Based upon a command from the personal computer (e.g., by CPUs of the light projection controlling circuit 20 and the light reception controlling circuit 30), the identification information is stored into the memory, to set the identification information. Further, foregoing ID1 to ID4 are an example of connection order identifying information for identifying the connection order of all of the serially connected phototransmitters and photoreceivers, as well as an example of optical axis formation identifying information for identifying the light projecting elements and the light receiving elements which form optical axes by means of the identification information "1" and "2" making a pair of connection order identifying information correspond to each other.

Further, although the identification information setting unit is provided in each of all of the phototransmitters 2A, 2B and the photoreceivers 3A, 3B in the present embodiment, such a configuration may be formed that, for example, the identification information setting unit is provided only in the photoreceiver 3A as the master (in this case, identification information including the connection order of the phototransmitters 2A, 2B and the photoreceivers 3A, 3B is set to the photoreceiver 3A). Further, the identification information setting units may be provided only in the phototransmitters 2A, 2B and only the phototransmitters 2A, 2B side may be switched, or the identification information setting units may be provided only in the phototransmitters 3A, 3B and only the phototransmitters 3A, 3B side may be switched. This can save a memory resource.

Other Wiring Forms

Figure 10:
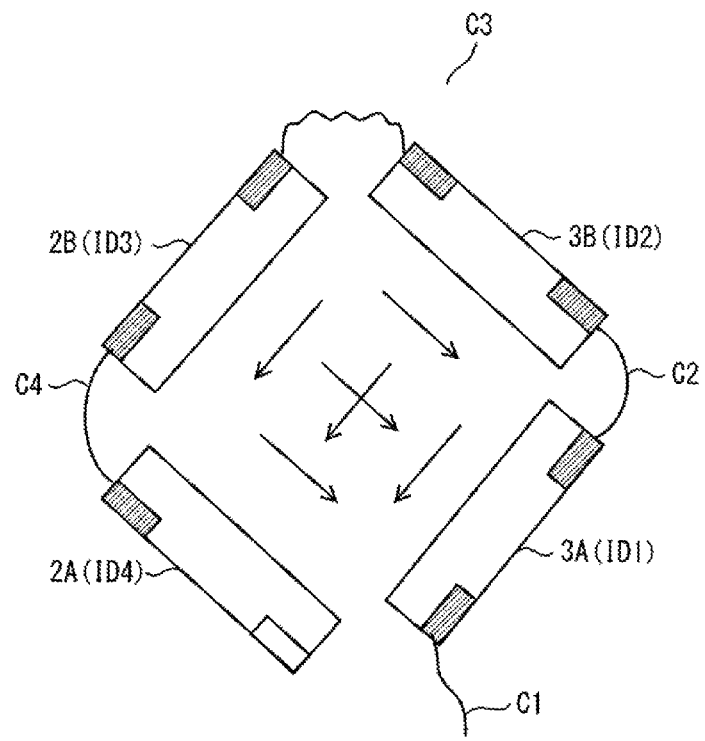
FIG. 10 is an explanatory view for describing another wiring form at the time of serially adding the multi-optical axis photoelectric sensor according to the present embodiment.
Figure 11:
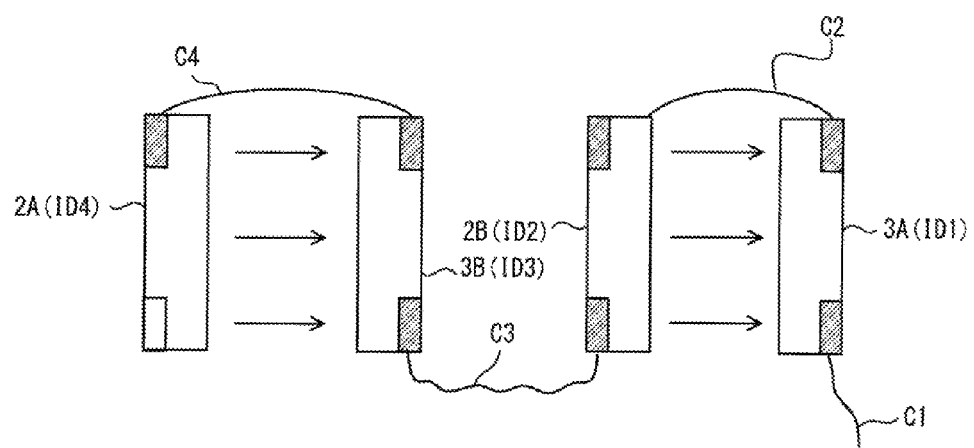
FIG. 11 is an explanatory view for describing another wiring form at the time of serially adding the multi-optical axis photoelectric sensor according to the present embodiment.

FIGS. 10 to 12 are explanatory views for describing other wiring forms at the time of serially adding the multi-optical axis photoelectric sensor 1 according to the present embodiment.

FIG. 10 shows a state where the photoreceiver 3A and the phototransmitter 2B are opposed to each other and the photoreceiver 3B and the phototransmitter 2A are opposed to each other. As in FIG. 7, ID1 to ID4 are allocated (set at power-on) to the photoreceiver 3A, the photoreceiver 3B, the phototransmitter 2B and the phototransmitter 2A in this order, and when the identification information "1" is set to ID2 and ID4 and the identification information "2" is set to ID3 and ID1, the phototransmitter 2A of ID4 and the photoreceiver 3B set with ID2 are synchronized, thereby to synchronize the phototransmitter 2B set with ID3 and the photoreceiver 3A set with ID1.

FIG. 11 shows a state where the photoreceiver 3A and the phototransmitter 2B are opposed to each other and the photoreceiver 3B and the phototransmitter 2A are opposed to each other. As shown in FIG. 11, even in the case of the phototransmitters and the photoreceivers being connected in an alternate and serial manner, the multi-optical axis photoelectric sensor can be prevented from performing an erroneous operation due to the interference by previously setting identification information for identifying the light projecting elements and the light receiving elements which form optical axes. For example, in the case of ID1 to ID4 having been allocated in the order from one closest to the control panel and the identification information "1" having been set to ID1 and ID2 while the identification information "2" having been set to ID3 and ID4, ID1 and ID2 are synchronized, thereby to synchronize ID3 and ID4, allowing prevention of the multi-optical axis photoelectric sensor from performing an erroneous operation due to the interference.

FIG. 12 shows a state where the photoreceiver 3A and the phototransmitter 2A are opposed to each other, and the photoreceiver 3B and the phototransmitter 2B are opposed to each other. For example, in the case of ID1 to ID4 having been allocated in the order from one closest to the control panel and the identification information "1" having been set to ID1 and ID4 while the identification information "2" having been set to ID2 and ID3, ID1 and ID4 are synchronized, thereby to synchronize ID2 and ID3, allowing prevention of the multi-optical axis photoelectric sensor from performing an erroneous operation due to the interference.

In addition, in the wiring form shown in FIG. 7, it is not possible to simultaneously scan both the optical axis formed by the phototransmitter 2A and the photoreceiver 3A and the optical axis formed by the phototransmitter 2B and the photoreceiver 3B. However, for example by means of optical synchronous communications where a plurality of light projection periods are used to prevent the interference, it is possible to simultaneously scan both the optical axis formed by the phototransmitter 2A and the photoreceiver 3A and the optical axis formed by the phototransmitter 2B and the photoreceiver 3B. Specifically, mutual interference of both optical beams can be prevented by intentionally changing a pulse period of an optical beam projected and received between the phototransmitter 2A and the photoreceiver 3A and a pulse period of an optical beam projected and received between the phototransmitter 2B and the photoreceiver 3B. Further, as compared with the case of not simultaneously scanning both optical axes, one cyclic period can be reduced into a half. In this case, for example as identification information, the photoreceiver 3A and the phototransmitter 2A are set to "Period 1", and the photoreceiver 3B and the phototransmitter 2B are set to "Period 2".

Installation Example of Multi-Optical Axis Photoelectric Sensor

Figure 13:
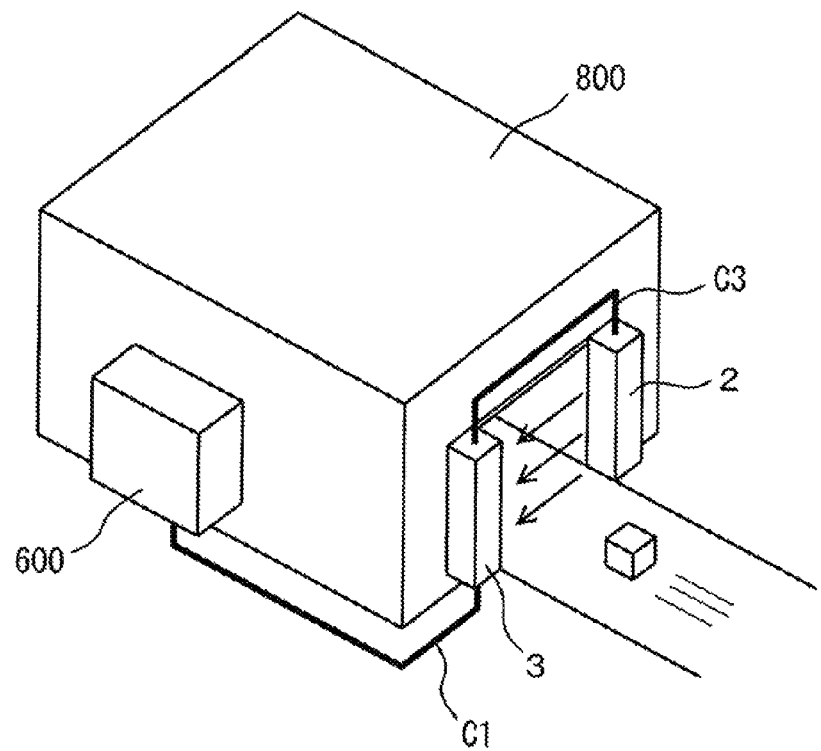
FIG. 13 is a conceptual view for describing an installation example of the multi-optical axis photoelectric sensor.
Figure 14:
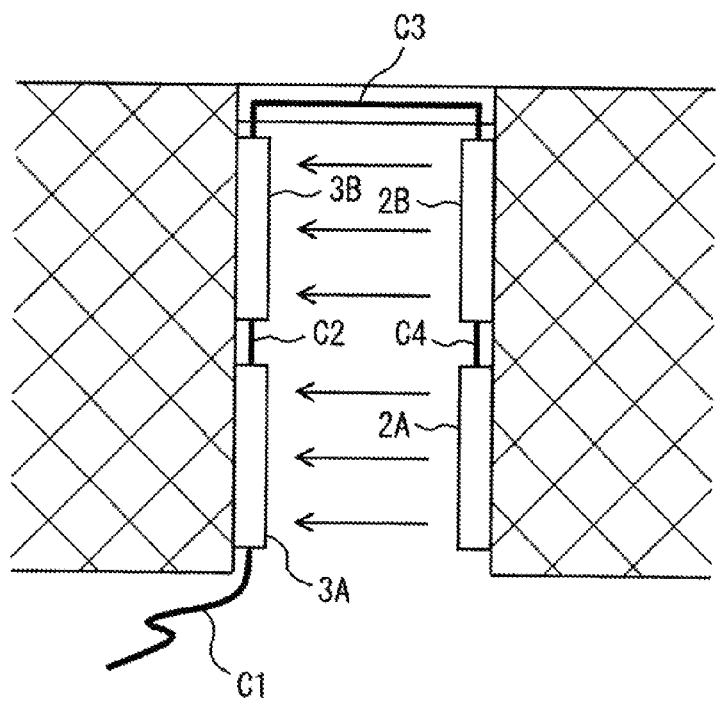
FIG. 14 is a conceptual view for describing an installation example of the multi-optical axis photoelectric sensor.
Figure 15:
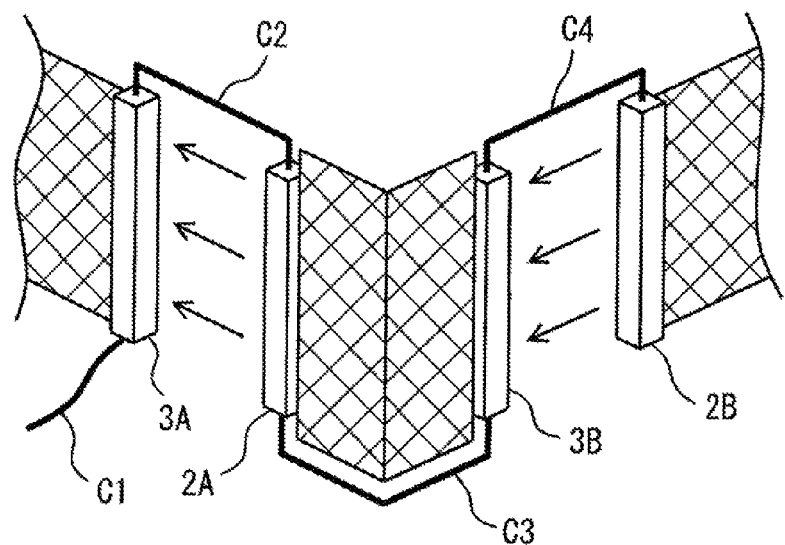
FIG. 15 is a conceptual view for describing an installation example of the multi-optical axis photoelectric sensor.

FIGS. 13 to 15 are conceptual views for describing installation examples of the multi-optical axis photoelectric sensor 1. Various forms as shown in FIGS. 13 to 15 may be considered as the installation examples of the multi-optical axis photoelectric sensor 1.

FIG. 13 shows a state where the phototransmitter 2 and the photoreceiver 3 are installed at an inlet of a presser 800, the cable C1 connected to a control panel 600 is connected to the photoreceiver 3, and the phototransmitter 2 and the photoreceiver 3 are coupled with each other through the cable C3. In FIG. 13, the multi-optical axis photoelectric sensor 1 in the wiring form described with reference to FIG. 1 is used.

FIG. 14 shows a state where the phototransmitters 2A, 2B and the photoreceivers 3A, 3B are installed at a doorway through which workers go in and out, the cable C1 connected to the control panel (not shown) is connected to the photoreceiver 3A, the photoreceiver 3B and the phototransmitter 2B are coupled with each other through the cable C3, the photoreceivers 3A, 3B are coupled with each other through the cable C2, and the phototransmitters 2A, 2B are coupled with each other through the cable C4. Although the multi-optical axis photoelectric sensor 1 in the wiring form described with reference to FIG. 7 is used in FIG. 14, the wiring form shown in FIG. 12 can also be considered.

Another installation example as shown in FIG. 15 can also be considered, for example. FIG. 15 shows a state where the phototransmitters 2A, 2B and the photoreceivers 3A, 3B are installed at two doorways through which the workers go in and out, the cable C1 connected to the control panel (not shown) is connected to the photoreceiver 3A, the photoreceiver 3A and the phototransmitter 2A are connected through the cable C2, the photoreceiver 3B and the phototransmitter 2B are coupled with each other through the cable C4, and the photoreceiver 3B and the phototransmitter 2A are coupled with each other through the cable C3. That is, the phototransmitters 2A, 2B and the photoreceivers 3A, 3B are alternately coupled with one another, and one line can also be realized even with such a wiring form. It should be noted that in FIG. 15, the multi-optical axis photoelectric sensor 1 in the wiring form described with reference to FIG. 11 is used (However, the phototransmitter 2A and the phototransmitter 2B have changed places.).

Figure 16:
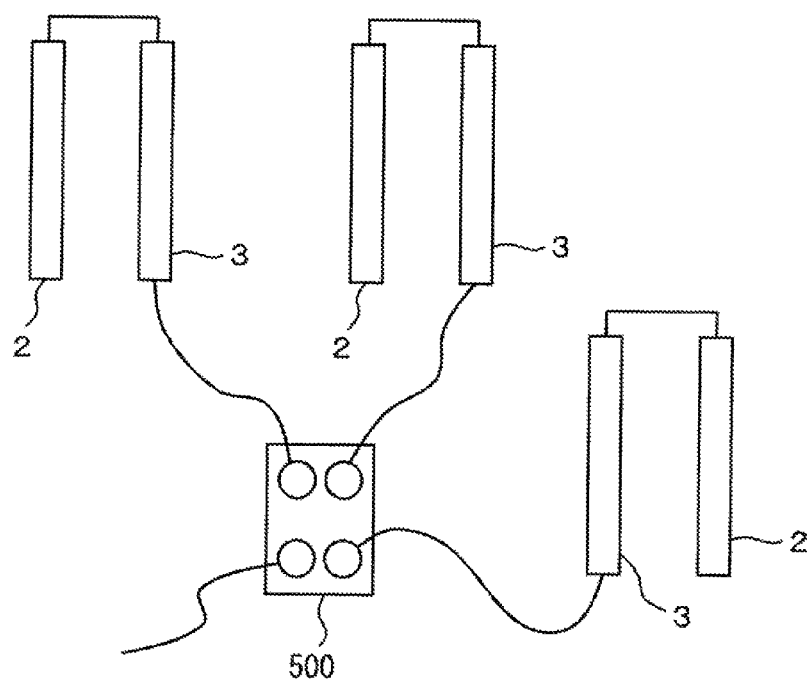
FIG. 16 is an explanatory view for describing such a wiring aspect as to connect to one controller a plurality of multi-optical axis photoelectric sensors including phototransmitters and photoreceivers.

Other than the above, as shown in FIG. 16, there can be considered such a wiring form that a plurality of multi-optical axis photoelectric sensors made up of the phototransmitters 2 and the photoreceivers 3 are connected to one controller 500. However, the controller 500 needs to be separately prepared. Further, as shown in FIG. 17, in terms of the shape of the connector, a connector K' in a shape different from in FIG. 4 may be used. In the connector K' shown in FIG. 17, the longitudinal direction of the phototransmitter 2 or the photoreceiver 3 is the same as a cable connected direction.

Moreover, although the phototransmitter 2A, the photoreceiver 3B, the photoreceiver 3A and the phototransmitter 2B are each handled as separate equipment in the wiring form shown in FIG. 12, for example, these can also be handled as an integrated phototransmitter/photoreceiver. In this case, a phototransmitter/photoreceiver including the phototransmitter 2A and the photoreceiver 3B is regarded as one phototransmitter/photoreceiver, and a phototransmitter/photoreceiver including the phototransmitter 2B and the photoreceiver 3A is regarded as the other phototransmitter/photoreceiver. Then, the other phototransmitter/photoreceiver can be provided with a first cable connecting section, connected with a cable including a power line for receiving power supply from the external apparatus such as the control panel and an output line for outputting a safe signal to the external apparatus, and a second cable connecting section, connected with a cable including a power line for performing power supply to the one phototransmitter/photoreceiver.

Principal Effect of the Embodiment

As described above, the multi-optical axis photoelectric sensor 1 according to the present embodiment is capable of cable-connecting the control panel and the photoreceiver 3 through the first cable connecting section (end section case 302, and cable connecting section 62), and cable-connecting the photoreceiver 3 and the phototransmitter 2 through the second cable connecting section (end section case 301, cable connecting section 64), to form one-line wiring from the control panel to the multi-optical axis photoelectric sensor 1, and it is thereby possible to prevent deterioration in workability of wiring work. Further, since the use of the T-branch connector is not necessary, it is possible to prevent an increase in wiring cost and deterioration in work efficiency.

What is claimed is:

1. A multi-optical axis photoelectric sensor comprising:
a phototransmitter having a plurality of light projecting elements; and
a photoreceiver, arranged so as to be opposed to the phototransmitter and having a plurality of light receiving elements that receive light projected from the plurality of light projecting elements,
in which a safe signal generated based upon an interrupted state of at least one optical axis among optical axes formed between the phototransmitter and the photoreceiver is outputted to an external apparatus, wherein
the photoreceiver includes
a first cable connecting section, connected with a cable including a power line for receiving power supply from the external apparatus and an output line for outputting a safe signal to the external apparatus, and
a second cable connecting section, connected with a cable including a power line for performing power supply to the phototransmitter and a communication line for transmitting or receiving a timing signal that defines timing for light projection of the light projecting elements.

2. A multi-optical axis photoelectric sensor comprising:
a phototransmitter having a plurality of light projecting elements; and
a photoreceiver, arranged so as to be opposed to the phototransmitter and having a plurality of light receiving elements that receive light projected from the plurality of light projecting elements,
in which a timing signal that defines timing for light projection of the light projecting elements between the phototransmitter and the photoreceiver is transmitted through optical communications, while a safe signal, generated based upon an interrupted state of at least one optical axis among optical axes formed between the phototransmitter and the photoreceiver, is outputted to an external apparatus, wherein
the photoreceiver includes
a first cable connecting section, connected with a cable including a power line for receiving power supply from the external apparatus and an output line for outputting a safe signal to the external apparatus, and
a second cable connecting section, connected with a cable including a power line for performing power supply to the phototransmitter.

3. The multi-optical axis photoelectric sensor according to claim 2, wherein the second cable connecting section is connected with a cable including a power line for performing power supply to the phototransmitter and a communication line for performing signal transmission between the phototransmitter and the photoreceiver.

4. The multi-optical axis photoelectric sensor according to claim 1, wherein
the first cable connecting section is provided at one end of the photoreceiver, and
the second cable connecting section is provided at the other end of the photoreceiver.

5. The multi-optical axis photoelectric sensor according to claim 1, wherein the photoreceiver is connected with a photoreceiver for serial addition through the second cable connecting section.

6. The multi-optical axis photoelectric sensor according to claim 5, wherein
the second cable connecting section of the photoreceiver is serially connected with at least two or more of the phototransmitters and at least one or more of the photoreceivers, and
the phototransmitter and/or the photoreceiver has an identification information setting unit for specifying the phototransmitter and the photoreceiver opposed to each other, to set identification information for identifying the light projecting elements and the light receiving elements which form optical axes.

7. The multi-optical axis photoelectric sensor according to claim 6, wherein the identification information set by the identification information setting unit includes
connection order identifying information for identifying an connection order of all of the serially connected phototransmitters and photoreceivers, and
optical axis formation identifying information for identifying the light projecting elements and the light receiving elements which form optical axes by making a pair of connection order identifying information correspond to each other.

8. A multi-optical axis photoelectric sensor comprising:
a pair of phototransmitter/photoreceiver having a plurality of light projecting elements and a plurality of light receiving elements,
in which a timing signal that defines timing for light projection of the light projecting elements between one phototransmitter/photoreceiver and the other phototransmitter/photoreceiver is transmitted through optical communications, while a safe signal, generated based upon an interrupted state of at least one optical axis among optical axes formed between the one phototransmitter/photoreceiver and the other phototransmitter/photoreceiver, is outputted to an external apparatus, wherein
the other phototransmitter/photoreceiver includes
a first cable connecting section, connected with a cable including a power line for receiving power supply from the external apparatus and an output line for outputting a safe signal to the external apparatus, and
a second cable connecting section, connected with a cable including a power line for performing power supply to the one phototransmitter/photoreceiver.

* * * * *